United States Patent Office 2,820,037
Patented Jan. 14, 1958

2,820,037
BENZIMIDAZOBENZOISOQUINOLINES

Wilhelm Schmidt-Nickels, Little York, N. J., assignor to General Aniline & Film Corporation, New York, N. Y., a corporation of Delaware No Drawing. Application May 24, 1956
Serial No. 586,916

12 Claims. (Cl. 260—282)

This invention relates to the preparation of dyestuff intermediates and relates more particularly to the preparation of novel compounds suitable for use as intermediates in the synthesis of vat dyestuffs.

It is an object of this invention to provide new compounds which are valuable intermediate products in the manufacture of vat dyestuffs.

Another object of this invention is the provision of a novel process for preparing the new dyestuff intermediates.

Other objects of this invention, together with the advantages thereof, will appear from the following detailed description and claims.

I have found that the 4-substituted 1,8-naphthoylene-benzimidazoles of the general formula

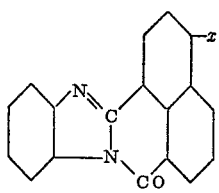

where $x$ is CN, COOH or COCl are valuable intermediates suitable for synthesizing vat dyestuffs, particularly the vat dyestuffs yielding on cotton material shades of good fastness ranging from red brown to dark chocolate brown. Such vat dyestuffs are described in my copending application Serial No. 586,905, filed on even date herewith.

The new compounds of this invention are obtainable by treating at an elevated temperature a 4-halogen-1,8-naphthoylene-benzimidazole with a metallic cyanide such as cuprous cyanide, in an organic base such as pyridine. Thus, where $x$ in the general formula is CN, i. e. 4-cyano-1,8-naphthoylene-benzimidazole, this compound is prepared by reacting 4-bromo-1,8-naphthoylene-benzimidazole with cuprous cyanide in pyridine at a temperature of 130 to 170° C., the cyanide formed having the formula

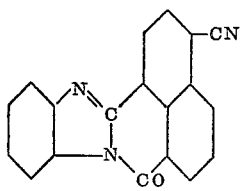

To form the compound 1,8-naphthoylene-benzimidazole 4-carboxylic acid, i. e. where $x$ in the general formula is COOH, the above 4-cyano-1,8-naphthoylene-benzimidazole is saponified in a mixture of even parts of concentrated sulfuric acid, glacial acetic acid and water at a temperature of 100 to 140° C., the acid formed having the formula

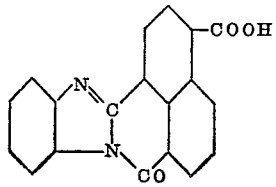

The compound 1,8-naphthoylene-benzimidazole-4-carboxylic acid chloride, i. e. where $x$ in the general formula is COCl, is prepared by reacting the 1,8-naphthoylene-benzimidazole-4-carboxylic acid with either thionyl chloride or a phosphorous chloride, the acid chloride formed having the formula

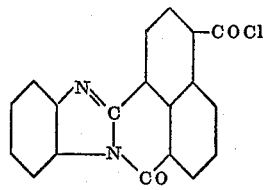

It is to be understood that the 4-substituted 1,8-naphthoylene-benzimidazole compounds can be composed of the following two isomers:

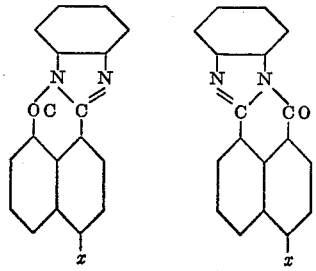

where $x$ is CN, COOH or ClCl.

The instant invention is further illustrated by the following examples which are not intended to be in any way limitative.

Example I

An autoclave was charged with 500 parts by volume of pyridine, 70 parts by weight of 4-bromo-1,8-naphthoylene-benzimidazole (prepared by the reaction of 4-bromonaphthalic anhydride with ortho-phenylene diamine in glacial acetic acid), and 22 parts by weight of cuprous cyanide. The charge was stirred at 150° C. for 25 hours and then allowed to cool to room temperature. 500 parts by volume concentrated aqueous ammonia (28%) were added of which a part was used to rinse out the autoclave. The reaction product, 4-cyano-1,8-naphthoylene-benzimidazole, was filtered off, washed neutral and dried. Weight obtained=45.4 parts by weight or 77% of the theory. For further purification the product was sublimed under a vacuum of 0.3 mm. giving 79% of sublimate.

Found for the sublimed compound: M. P. 257–260° C.
Found: C=77.27%, H=3.22%, N=14.11%
Theory $C_{19}H_9ON_3$: C=77.29%, H=3.05%, N=14.24%

Example II 10 parts by volume of concentrated sulfuric acid (96%) were added to 10 parts by weight of ice. After addition of 10 parts by volume of glacial acetic acid 5 parts by weight of 4-cyano-1,8-naphthoylene-benzimidazole, sublimed, prepared as described in Example I, were introduced. The charge was stirred at 120° C. for 5 hours and then poured into 600 parts by volume of water. The precipitated reaction product was filtered, washed neutral and introduced into 100 cc. 2% sodium hydroxide solution. After heating to boiling practically all the material had gone in solution. The filtered solution was acidified with 5% hydrochloric acid which resulted in the precipitation of pure 1,8-naphthoylene-benzimidazole-4-carboxylic acid which was filtered, washed neutral and dried. Weight obtained=4.5 parts by weight or 84% of the theory.

Found: N=8.83%
Theory $C_{19}H_{10}O_3N_2$: N=8.92%

Example III

A charge of 28 parts by volume of nitrobenzene and 4.0 parts by weight of 1,8-naphthoylene-benzimidazole-4-carboxylic acid, prepared as described in Example II, was heated to 192° C. At this temperature, a solution of 4.5 parts by volume of nitrobenzene and 4.5 parts by volume of thionylchloride was dropped into the reaction vessel over a period of 13 minutes. Agitation was continued at 175–180° C. for ½ hour. After the charge had cooled to room temperature, the reaction product was filtered off, washed with 7 parts by volume of benzene, then stirred for 10 minutes in 20 parts by volume of benzene, filtered off again and washed with a small amount of benzene. Weight of dry product obtained=3.4 parts by weight or 80% of the theory of 1,8-naphthoylene-benzimidazole-4-carboxylic acid chloride.

It is to be understood that the foregoing detailed description is merely given by way of illustration and that many variations may be made therein without departing from the spirit of my invention.

Having described my invention, what I desire to secure by Letters Patent is:

1. A 4-substituted 1,8-naphthoylene-benzimidazole of the general formula

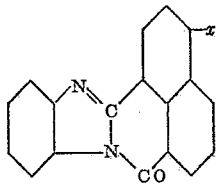

where $x$ is CN, COOH or COCl.

2. 4-cyano-1,8-naphthoylene-benzimidazole.
3. 1,8-naphthoylene-benzimidazole-4-carboxylic acid.
4. 1,8-naphthoylene-benzimidazole-4-carboxylic acid chloride.
5. Process for preparing a compound of claim 1, which comprises treating a 4-halogen-1,8-naphthoylene-benzimidazole with a metallic cyanide at an elevated temperature in the presence of an organic base.
6. Process for preparing 4-cyano-1,8-naphthoylene-benzimidazole, which comprises reacting 4-bromo-1,8-naphthoylene-benzimidazole with cuprous cyanide at a temperature of 130 to 170° C. in the presence of an organic base.
7. Process for preparing 4-cyano-1,8-naphthoylene-benzimidazole, which comprises reacting 4-bromo-1,8-naphthoylene-benzimidazole with cuprous cyanide at a temperature of 130 to 170° C. in the presence of pyridine.
8. Process for preparing 1,8-naphthoylene-benzimidazole-4-carboxylic acid, which comprises the step of saponifying 4-cyano-1,8-naphthoylene-benzimidazole in a mixture of concentrated sulfuric acid, glacial acetic acid and water at a temperature of 100 to 140° C.
9. Process for preparing 1,8-naphthoylene-benzimidazole-4-carboxylic acid, which comprises the step of saponifying 4-cyano-1,8-naphthoylene-benzimidazole in a mixture of equal parts of concentrated sulfuric acid, glacial acetic acid and water at a temperature of 100 to 140° C.
10. Process for perparing 1,8-naphthoylene-benzimidazole-4-carboxylic acid, which comprises reacting 1,8-naphthoylene-benzimidazole-4-carboxylic acid with cuprous cyanide at a temperature of 130 to 170° C. in the presence of pyridine, and saponifying the 4-cyano-1,8-naphthoylene-benzimidazole formed in a mixture of equal parts of concentrated sulfuric acid, glacial acetic acid and water at a temperature of 100 to 140° C.
11. Process for preparing 1,8-naphthoylene-benzimidazole-4-carboxylic acid chloride, which comprises reacting 1,8-naphthoylene-benzimidazole-4-carboxylic acid with a compound, selected from the group consisting of thionyl chloride and phosphorus chloride.
12. Process for preparing 1,8-naphthoylene-benzimidazole-4-carboxylic acid chloride, which comprises reacting 4-bromo-1,8-naphthoylene-benzimidazole with cuprous cyanide at a temperature of 130 to 170° C. in the presence of pyridine, saponifying the 4-cyano-1,8-naphthoylene-benzimidazole formed, and reacting 1,8-naphthoylene-benzimidazole-4-carboxylic acid formed with a compound, selected from the group consisting of thionyl chloride and phosphorus chloride.

No references cited.